United States Patent

Van Hook

[11] 4,060,907
[45] Dec. 6, 1977

[54] MEDIA SKEW COMPENSATOR

[75] Inventor: Danny Allen Van Hook, Boulder, Colo.

[73] Assignee: International Business Machines Corporation, Armonk, N.Y.

[21] Appl. No.: 726,892

[22] Filed: Sept. 27, 1976

[51] Int. Cl.² .............................................. B41B 27/42
[52] U.S. Cl. .................................... 33/184.5; 250/560
[58] Field of Search ......................... 33/184.5, 125 C; 250/548, 560, 561, 202

[56] References Cited

U.S. PATENT DOCUMENTS

| 2,095,542 | 10/1937 | Claybourn | 33/184.5 |
|---|---|---|---|
| 2,931,917 | 4/1960 | Beelitz | 250/560 |
| 3,090,534 | 5/1963 | Frommer et al. | 250/561 |
| 3,108,727 | 10/1963 | Farber | 250/561 |
| 3,384,753 | 5/1968 | Revesz | 250/560 |
| 3,679,316 | 7/1972 | Boujon | 33/184.5 |
| 3,802,774 | 4/1974 | Eschler et al. | 250/560 |

Primary Examiner—Richard E. Aegerter
Assistant Examiner—Willis Little
Attorney, Agent, or Firm—John B. Frisone

[57] ABSTRACT

A pair of detectors provide signals coincident with the circumferential and axial edges of a print medium mounted on a rotating media support drum. These signals are used to control counters which respond to an emitter circumferentially disposed with respect to the drum to generate a preset or offset signal value and a gate signal to accommodate axial and circumferential misalignment of the print medium on the drum.

5 Claims, 3 Drawing Figures

MEDIA SKEW COMPENSATOR

BACKGROUND OF THE INVENTION

The invention relates to printers in which an entire print medium is positioned on a drum or similar support and in which a partial or complete image is stored with respect to the support and more particularly to circuits including detectors for generating skew or offset signals which may be used to modify the addresses from which image data is retrieved so that the image will be placed squarely on the print media.

The invention is particularly suitable for use in an ink jet copier such as that described in my copending U.S. patent application Ser. No. 700,631 filed June 28, 1976, and assigned to the same assignee as this application. The output signal provided may be utilized directly in the register 17 to correct for misalignments between the media support surface and the print media.

SUMMARY OF THE INVENTION

The invention contemplates circuit means for providing a signal indicative of the displacement of a substantially rectangular print media from a predetermined position on a print media support and in which the print elements traverse the media in a first direction while the media moves cyclically with respect thereto in a second orthogonally oriented direction comprising: a first sensor movable with the print elements for detecting the first of two parallel media edges, a second sensor fixed with respect to the media support for detecting the first of two different parallel media edges, first means associated with said media support for providing a fixed plurality of signal pulses in each cycle of movement, counter means responsive to said second sensor for resetting under control of the second sensor output, second means responsive to the first means and the first sensor means for providing stepping signals to the said counter means under control of the output from said first means and for discontinuing said stepping signals in response to the output from said first sensor and providing the attained counter value as a preset output indicative of the print media skew with respect to the print media support.

DESCRIPTION OF THE PREFERRED EMBODIMENT

Figure 1:
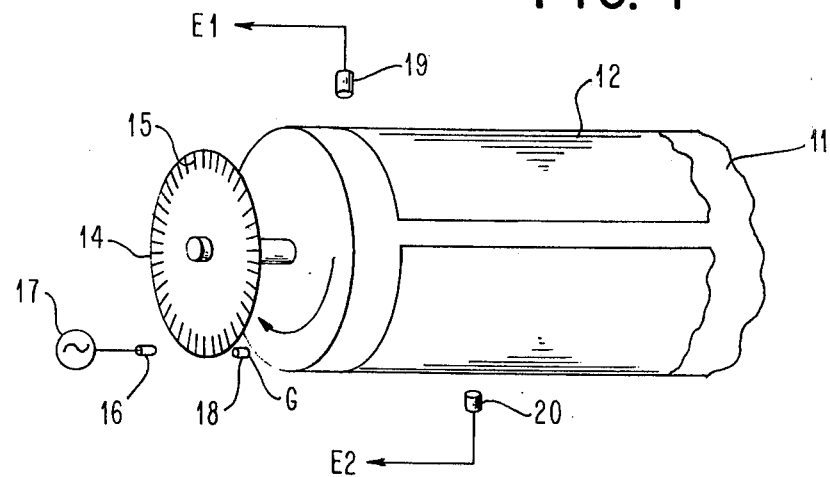
FIG. 1 is a schematic perspective view of a copier or printer media support and associated sensors and signal generator.

In FIG. 1 a cylindrical drum 11 is adapted to support a print media 12. In general, the media 12 will be applied to drum 11 by automatic paper handling means not shown here since the specific means used for applying and holding the media 12 on drum 11 is not pertinent to the invention. However, whatever means are used, the registration of the media 12 on the drum 11 is at best difficult to control. Thus, data which is to be printed on the media and stored in a memory with reference to the drum must be retrieved and applied at a time when the media which may be skewed with respect to the drum orientation is in the appropriate position.

A substantially opaque disc 14 is attached to and rotated with drum 11. The disc includes a plurality of equispaced transparent slits 15 arranged about the disc periphery. These slits pass light from a light source 16 which is continuously energized by a power supply 17. The light passing through the slits 15 impinges on a photo detector 18 which provides a pulse each time a slit 15 passes between the light source 16 and the detector 18. The output G of photo detector 18 is illustrated in graph (2) of FIG. 2 and comprises a continuous series of substantially equispaced pulses assuming a substantially constant drum velocity and substantially equal spacing between the slits 15.

Another photo detector 19 is mounted on the ink jet nozzle transport and moves in an axial direction parallel to the drum surface. This detector provides an output E1 illustrated in graph (3) of FIG. 2. The change in potential illustrated in graph (3) occurs when the detector 19 passes over the circumferentially disposed paper edge illustrated in FIG. 1. A third photo detector 20 is mounted on stationary structure not illustrated adjacent the drum surface and provides an output E2 illustrated in graph (1) of FIG. 2. The leading and trailing edges of the negative pulses illustrated in graph (1) coincide with the axially disposed paper edges illustrated in FIG. 1.

Figure 2:
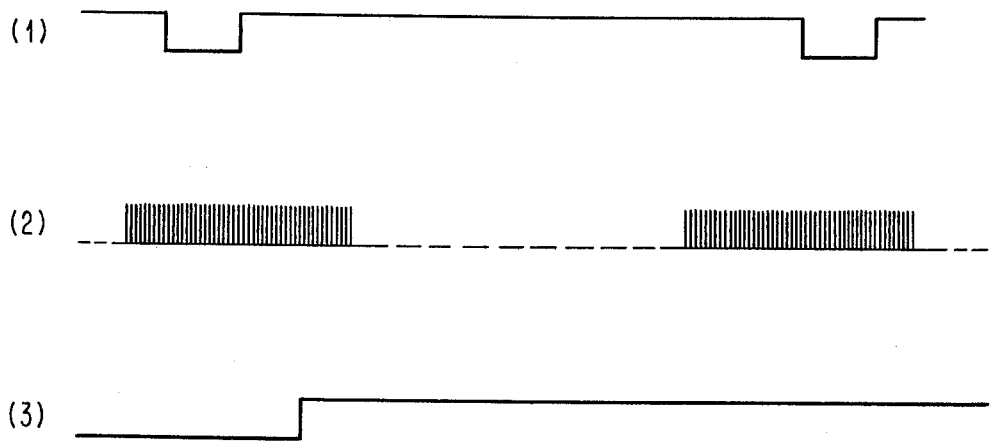
FIG. 2 is a graphical representation of the signals generated by the components illustrated in FIG. 1 during a complete cycle of operation.
Figure 3:
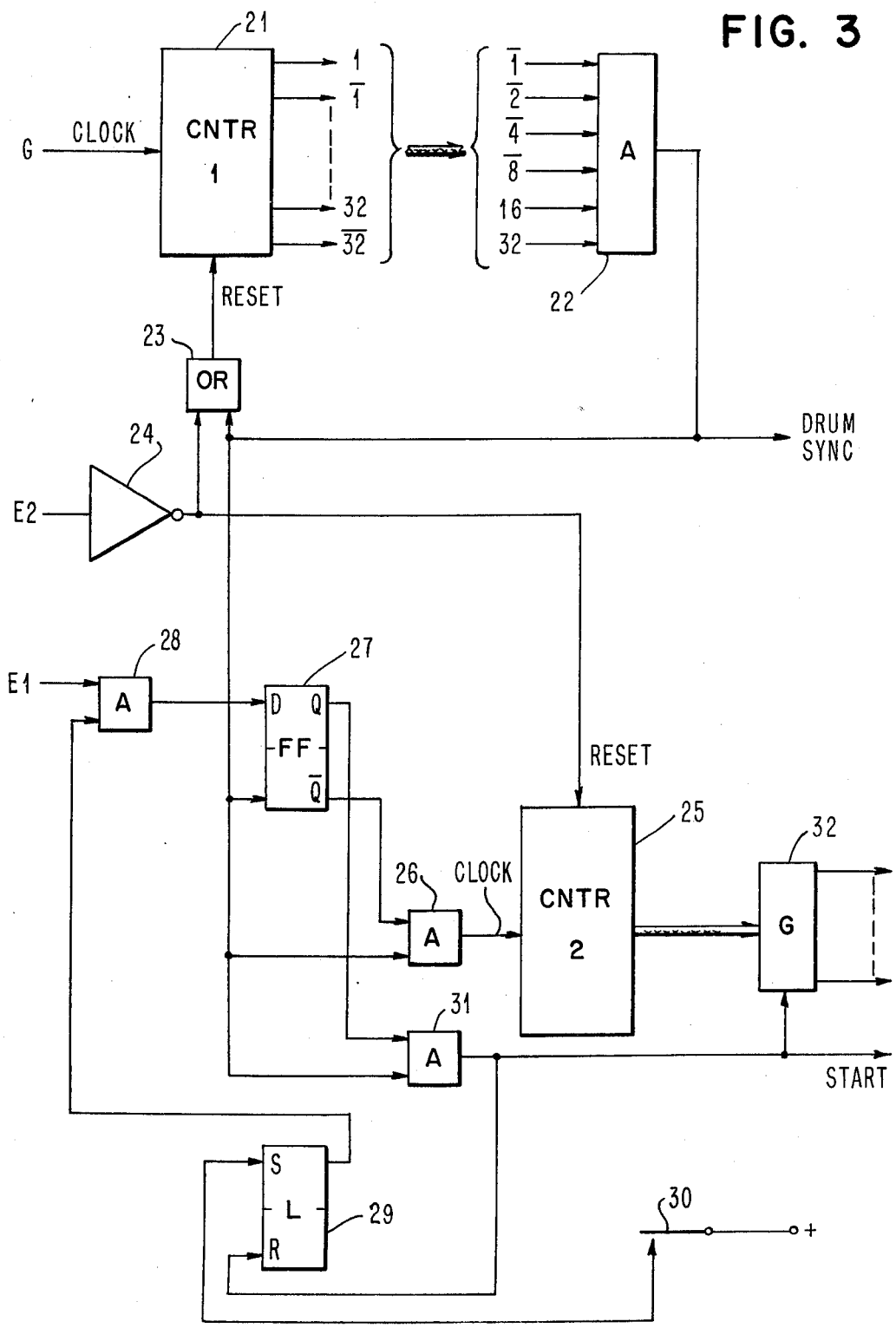
FIG. 3 is a schematic block diagram of the circuits which utilize the signals illustrated in FIG. 2 and produce the desired outputs indicative of the skew between the media and the media support.

In FIG. 3 the signal G from detector 18 is applied to a counter 21 which counts the G pulses on a continuous basis. Counter 21 is reset by an AND gate 22 which provides an output on the count of 48, arbitrarily selected, via on OR gate 23. The output of AND gate 22 is also supplied as the drum sync signal described in the pending application cited above. The E2 signal from generator 20 is inverted by an inverter 24 and applied to OR gate 23 to also reset the counter 21 on the trailing edge of the E2 pulse as illustrated in FIG. 2. With this arrangement the number of drum sync signals occurring in each revolution of the drum may be selected by selecting the total number of slits and picking an appropriate reset count via gates 22 and 23. If forty drum syncs are desired per revolution, 1920 slits and a reset value of 48 will provide the forty drum syncs per drum revolution.

The trailing edge of the E2 pulse marks or identifies the left axial or longitudinal edge of the paper. This pulse, available at the output of inverter 24, is used to reset a counter 25. The drum sync pulses from gate 22 advance counter 25. These are applied via an AND gate 26 under the control of flip-flop 27 which receives the drum sync signal at its clock input and the E1 signal at its D input. The E1 signal is applied via an AND gate 28 which is enabled by the set output of a latch 29. Latch 29 is manually set by the momentary closure of a "COPY" switch 30. Thus, on each rotation of the drum 11 the number of drum sync signals or sectors is counted until the circumferential paper edge defining the top of the paper is encountered. This count contained in counter 25 is the preset value required and constitutes a definition of the skew of the paper 12 with respect to the drum 11. Stated differently, this signal represents the circumferential displacement of the left paper edge from the fixed detector 20 when the detector 19 mounted on the nozzle transport is coincident with the top paper edge and thus may be used to directly modify the address from which image data is selected. This offset value causes the stored image to be applied squarely on the paper. The count is stopped by the E1 signal on the occurrence of the next drum sync when the flip-flop 27 changes state.

An AND gate 31 connected to drum sync and the Q output of flip-flop 27 senses these conditions and resets latch 29. In addition, this output is applied to activate a gate 32 to provide the value of counter 25 to the utilization circuits described in the above referenced patent application.

If the circumferentially disposed paper edge is not encountered in a rotation of the drum 11, counter 25 advances to its maximum value and resets on the occurrence of a subsequent E2 signal to repeat the above described sequence.

Under certain operating conditions the arrangement described above may produce an erroneous output. This could occur if the detector 19 crosses the circumferential paper edge in the uncovered drum area between the confronting axial paper edges. This condition will not occur if minor constraints on paper placement are observed. However, if two detectors circumferentially spaced are ORed together to provide the E1 output, no constraints whatsoever need be placed on the paper placement since it would be physically impossible for both detectors to reside in the uncovered area at the same time. The spacing of the two detectors should be chosen to be greater than the maximum distance between the confronting paper edges. A selection of 180° spacing provides maximum separation, thus permitting the widest range of paper sizes which can be accommodated for any given drum diameter.

The preferred embodiment described above utilizes two detectors 19 and 20 or potentially a pair in lieu of 19 if unconstrained paper placement is desired. The same function can be achieved with one or two detectors in several different ways. For example, the pulse generated by detector 19 when it crosses the circumferential paper edge may be used to start counter 25 counting drum sync pulses from gate 22; and a subsequent pulse from detector 19 which will occur when the detector later crosses an axial edge for the first time is used to stop counter 25 and gate the contents of counter 25 which represent the skew of the paper on the drum surface. In this instance detector 19 performs a dual function, but the measurement made is, except for a fixed factor, the same as described above in the preferred embodiment. The fixed factor may be simply compensated for by adjusting the distance between the print elements and the detector 19 to compensate for the time delay required to advance the detector 19 sufficiently to detect the axial edge after first detecting the circumferential edge. Here again a pair of detectors ORed together may be substituted for the single detector 19 if totally unconstrained paper placement is desired.

While the invention has been particularly shown and described with reference to a preferred embodiment thereof, it will be understood by those skilled in the art that various changes in form and details may be made therein without departing from the spirit and scope of the invention.

What is claimed is:

1. In a printer including a print media support and a plurality of print elements arranged to traverse the print media support in a first direction while the print media support moves cyclically in a substantially orthogonal second direction, circuit means for providing a signal indicative of the location of a print media mounted on the print media support comprising:

first sensor means movable in conjunction with said print elements and providing a first signal upon detecting the first of two parallel print media edges;

second sensor means fixed with respect to said media support for providing a second signal upon detecting the first of two parallel print media edges which are oriented substantially orthogonal to the edges sensed by the first sensor means;

first means operating in synchronism with said media support for providing a fixed plurality of signal pulses in each cycle of media support movement;

counter means responsive to said second signal for resetting under control thereof;

second means responsive to said first means and the said first signal for providing stepping signals to the said counter means under control of said first means output and for discontinuing said stepping signals in response to said first signals; and, third means responsive to said second means for providing the attained counter value upon discontinuance of said stepping signals as a preset output indicative of the skew of the media edges with respect to the media support.

2. The circuit means set forth in claim 1 in which said print media support is a drum arranged for rotation about its axis and the print elements are arranged in a rectangular matrix on a support arranged for movement along the axial direction and in which:

the said first sensor means is a photo detector mounted on the print element support and arranged to detect one of the circumferentially disposed edges of the print media mounted on the cylindrical surface of the drum by detecting the difference in reflectivity between the drum surface and that of the print media;

the said second sensor means is a photo detector mounted stationary with respect to the rotating drum surface and arranged to detect the axially disposed media edges as the drum is rotated by detecting the difference in reflectivity between the drum surface and that of the print media; and the first means includes an emitter rotated in synchronism with the drum and arranged to provide a fixed number of pulses in each revolution thereof.

3. The circuit means set forth in claim 2 in which the preset output is a measure of the displacement of one of the axially disposed edges of the print media from the second sensor when the first sensor detects the first circumferentially disposed media edge.

4. The circuit means set forth in claim 3 in which said second means comprises:

a flip-flop responsive to the first means output and the first signal for assuming a first state providing a first state output signal when the first signal is in a first state upon the occurrence of the output from the first means and a second state providing a second state output when the first signal is in a second state upon the occurrence of the output from the first means; and gate means responsive to the first state output for applying the first means output to the said counter as stepping pulses as long as the said flip-flop remains in the said first state.

5. The circuit means set forth in claim 4 in which said first means comprises:

means for providing a plurality of signal pulses in synchronism with said drum rotation;

counter means responsive to said pulses from said means for counting said pulses;

gate means responsive to a predetermined count for providing one of the said signal pulses each time the said count is reached; and circuit means responsive to said pulses from the said gate means and the said second signal from the said second sensor means for applying said signals to reset the counter means.

* * * * *